United States Patent Office 3,753,853
Patented Aug. 21, 1973

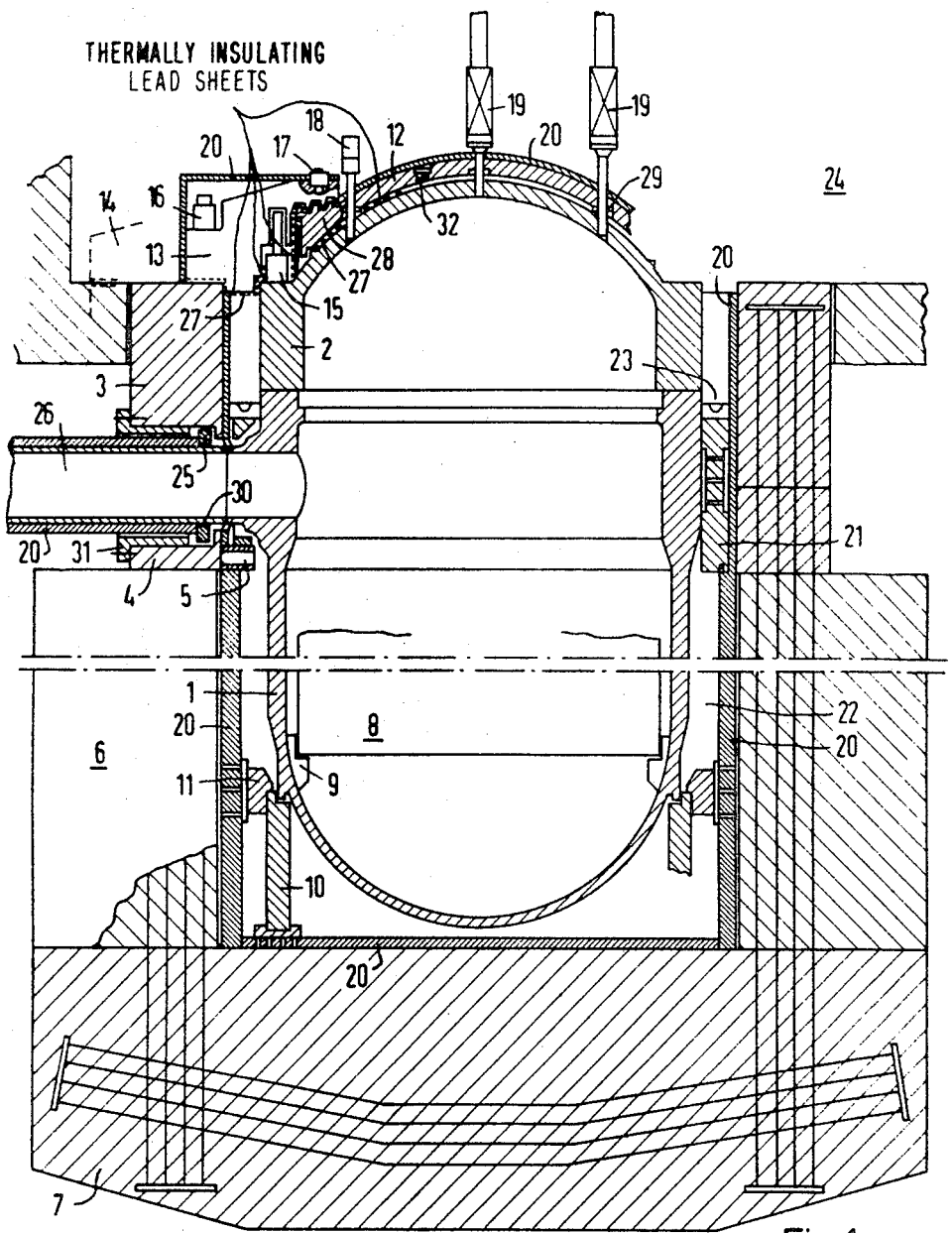
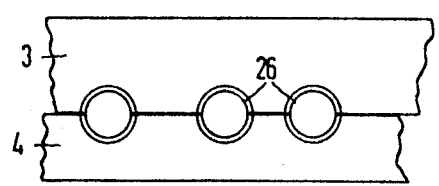
Fig. 1
Fig. 2

3,753,853
SAFETY DEVICE FOR PRESSURE VESSELS
ESPECIALLY FOR NUCLEAR REACTORS
Hans-Peter Schabert, Erlangen, Germany, assignor to
Siemens Aktiengesellschaft, Berlin and Munich, Germany
Filed Sept. 24, 1970, Ser. No. 74,988
Claims priority, application Germany, Sept. 25, 1969,
P 19 48 522.4
Int. Cl. G21c *13/00*
U.S. Cl. 176—38                        11 Claims

ABSTRACT OF THE DISCLOSURE

Safety device for pressure vessel having a cover to which tubes are secured includes a capture cover disposed on the outside of the pressure vessel cover, the capture cover becoming effective for covering the pressure vessel pursuant to rupture of the pressure vessel cover, the capture cover being formed with openings through which the tubes secured to the pressure vessel cover extend and being removable from the pressure vessel together with the pressure vessel cover.

---

My invention relates to safety device for pressure vessels especially for nuclear reactors.

Due to the ever increasing size of pressure vessels especially for nuclear reactors and due to the constant striving for constructing nuclear power plants in the vicinity of or in regions having high population density, consideration must be given, with respect to the safety layout of the reactor, to greater extent to the possibility of an accident due to sudden rupture of the reactor pressure vessel.

In this regard it has been proposed heretofore to hold down the reactor cover with the aid of a tubular structure even when all of the cover screws or bolts have ruptured. This proposal has the disadvantage, however, that the rupture of the generally spherical collet-shaped cover proper does not become controlled or checked and that, moreover, it appears questionable if a fracture in the upper flange of the pressure vessel, in fact in the vicinity of the pipes or tubes entering the pressure vessel, is controllable. Furthermore, the forces produced by the accident extend upwardly over distances of several meters from the reactor cover and then extend along the same path back into the biological shield, due to the relatively long hold-down structure, so that the reactor cover and the reactor insert devices and members are subjected to relatively great displacements when an accident occurs. This can place in doubt the reliability of the emergency feeding to the reactor.

It is accordingly an object of my invention to provide safety device for pressure vessels especially for nuclear reactors which controls or checks the rupture of the pressure vessel cover or of another part of the pressure vessel, on the one hand, and which prevents unduly high discharge rates of the coolant, on the other hand.

With the foregoing and other objects in view, I provide in accordance with my invention safety device for pressure vessels having a cover to which tubes are secured comprising a capture cover disposed on the outside of the pressure vessel cover, the capture cover becoming effective for covering the pressure vessel pursuant to rupture of the pressure vessel cover, the capture cover being formed with opening through which the tubes secured to the pressure vessel cover extend and being removable from the pressure vessel together with the pressure vessel cover.

In accordance with another feature of the invention, the pressure vessel is for a water-cooled nuclear reactor having a reactor core contained in the pressure vessel, the pressure vessel being provided with a cover, the capture cover being disposed on the side of the reactor pressure vessel cover facing away from the reactor core.

In accordance with a further feature of the invention, the capture cover only covers the area of the pressure vessel cover located between the threaded fasteners for the cover and is held by a capture ring which extends radially inwardly over the cover screws and the outer region of the capture cover and radially outwardly over holder screws with which an anchor ring covering the coolant pipes of the pressure vessel is threadedly secured.

In a pressure vessel having a relatively large diameter, in accordance with an additional feature of my invention I form the capture ring, for reasons of manufacture or transportation, out of individual segments having outwardly extending supporting arms. In accordance with yet another feature of the invention, the capture ring is in engagement with the capture cover through a saw-tooth joint exhibiting play, when the reactor operates normally.

In accordance with an added feature of my invention, to protect the pressure vessel against displacements, I provide vertical and radial emergency supports between the nuclear container or core and the reactor pressure vessel, on the one hand, as well as the reactor pressure vessel and the concrete shielding, on the other hand, these emergency supports becoming effective only when a rupture of the pressure vessel occurs.

To inspect the pressure vessel cover from the outside, in accordance with another feature of my invention, I provide means for raising the capture cover slightly above the pressure vessel cover the capture cover having a threaded opening closed by a removable threaded plug, the plug being removable to afford observation of the capture cover through the opening, for example by an electron microscope or the like.

In accordance with a concomitant feature of my invention, in order to limit the discharge of coolant, during rupture of the pressure vessel, the main coolant lines are provided with piston rings in vicinity of the support and anchor rings; the piston rings being so disposed that in normal operation, they are held at the respective lines securely against vibration and are torn out of the holder therefor only by the forces produced by an accident and are brought into abutting engagement with radial sealing surfaces.

In accordance with a further feature of the invention, thermally insulating intermediate sheets are mutually interposed between the pressure vessel cover, the capture cover, the capture ring and the anchor ring.

Other features which are considered as characteristic for the invention are set forth in the appended claims.

Although the invention is illustrated and described herein as embodied in Safety Device for Pressure Vessels Especially for Nuclear Reactors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a longitudinal sectional view of a nuclear reactor containment or pressure vessel installed vertically; and FIG. 2 is a fragmentary developed view in a flat plane of the anchor and support rings of FIG. 1.

Referring now to the drawing there is shown in FIG. 1, a cylindrical nuclear reactor containment or pressure vessel formed of a lower container portion 1 and a cover 2, and suspended in a concrete pressure vessel 6, which is prestressed in axial direction, however, only loosely armored or reinforced in tangential direction. In the vicinity of the main coolant pipe 26 of the reactor, the concrete pressure vessel 6 is in the form of a support ring 4 and an anchor ring 3, both of which are preferably made up of a heavy welded construction wherein numerous tangentially extending reinforcing irons are inserted and cast in concrete. As is apparent from the planar developed view of FIG. 2, the support rung 4 mounted on the concrete pressure vessel 6, and the anchor ring 3 located above the support ring 4 are constructed so as to provide openings only for the main coolant pipes 26 which are tightly enclosed. Structurally, both of the rings 3 and 4 provide a lengthening of the concrete pressure vessel 6 in upward direction, as viewed in FIG. 1, and resist or withstand the full inner pressure in the event of an accident.

To protect the reactor cover 2 against rupture, a capture cover 12, in the form of a spherical collet is located above the similarly shaped reactor cover 2 in the region between the screws or bolts 15 of the pressure vessel cover 2 so that the support thereof can preferably elastically absorb a given radial relative thermal expansion while very great relative displacements are reliably avoided by suitable form-locking techniques. Control rod tubes 19 and nuclear instrumentation tubes 18 are threadedly secured into the reactor vessel in a conventional manner and welded therein after being passed through appropriate openings provided in the capture cover 12. The play between the tubes 18 and 19, on the one hand, and the capture cover 12 is greater than the maximum possible radial displacement between the capture cover 12 and the reactor cover 2. After the tubes 18 and 19 are screwed into the reactor cover 2, the latter and the capture cover 12 can no longer be separated from one another. The total weight thereof is, however, considerably below the maximum carrying force of the conventional reactor crane, because the latter is designed conventionally for handling the much greater weight of the lower containment portion 1 of the reactor vessel. The capture cover 12 is furnished, moreover, only with a relatively light flange 28 which is disposed within the range of the cover screws or bolts 15.

As a holder or support proper for the capture cover 12 in case of an accident, a capture ring 13 is provided which effects a saw-tooth connection or joint 17 with the flange 28, as shown in section in FIG. 1. The saw-tooth joint 17 actually provides a holding or supporting action for the capture cover 12, however, only if the reactor cover 2 moves upwardly. In normal operation, though, this saw-tooth joint or connection 17 has so much play that a thermal expansion of the reactor pressure vessel is freely possible. The capture ring 13 is held down on the anchor ring 3 by screws or bolts 16 located on the outside of the capture ring 13. Furthermore, the capture ring 13 is formed with blind bores or recesses for receiving therein the upwardly extending shanks of the reactor pressure vessel screws or bolts 15, while stationary crosspieces located therebetween are intended to increase the bending strength thereof.

The capture ring 13 is insulated from the reactor chamber. An auxiliary insulation in the form of a layer of lead is interposed between the anchor ring 3, on the one hand, and the capture cover 12, on the other hand. A similar lead layer insulation is interposed between the capture cover 12 and the reactor cover 2 as well as between the capture ring 13, on the one hand, and the reactor cover 2 and reactor cover screws or bolts 15, on the other hand. In this manner, the temperature of capture ring 13 is kept considerably below the temperature of the reactor vessel cover 2 and, furthermore, the temperature of the capture cover 12 is located between the foregoing temperatures so that the respective temperature differentials between the individual heavy structural members and the heat losses, accordingly, are kept within limited ranges.

The capture ring 13 can be cast or forged from relatively ductile steel. Should the dimensions thereof become too great for the construction thereof in one piece, the capture ring 13 can also be produced from a plurality of individual segments of which each individual segment can be supported by an elongated supporting arm 14 shown in dotted lines at the radially outer end of the respective individual segments on the anchor ring 3 which, in this case, should be given wider dimensions.

The support of the reactor pressure vessel 1 proper is effected in normal operation on light bearing paws 5 located below the main coolant pipes 26. This support of the bearing paws 5 is supposed to yield in the event of a contemplated great accident and to prevent damage to the main coolant lines. An auxiliary support segments 10 with an associated bearing ring. Lateral support at the occurrence of an accident is effected by removable radial support segments 11 and, in the region between the coolant pipes 26, by shield segments 21 of heat-resistant concrete which are reinforced with respective inner steel supports. The upward support, as aforedescribed, is afforded by the capture cover 12 and the capture ring 13. The possible displacement of the pressure vessel in each lateral direction is limited to a few centimeters so that the ripping off of the main coolant lines 26 or damage to the built-in nuclear reactor devices and members can be precluded. For that purpose, furthermore, the nuclear container or core 8 is supported from below on consoles 9, the reactive forces on the latter being directly transmitted through the lower emergency support 10 for the pressure vessel. All emergency supports are not in engagement or action during normal operation of the reactor and do not, therefore in any manner, hinder the free thermal expansion of the reactor pressure vessel. These emergency supports can furthermore be removed piecewise by opening a sealing membrane 23 located at a main flange for the concrete pressure vessel, thereby permitting free access to an annular space 22 surrounding the reactor pressure vessel for the purpose of conducting inspections and ultrasonic testing from the outside.

In order, further, to prevent the coolant discharge in the vicinity of the main coolant pipe or the control rod tubes from reaching an unduly high rate in case of a pressure vessel rupture, the respective discharge cross sections are reduced by means of piston rings 25 and 29 which can be displaced with the corresponding pipes or tubes, in emergencies. To prevent these piston rings 25 and 29 from oscillating or vibrating and damaging the lines i.e. the pipes 26 and tubes 18 and 19, during normal operation of the reactor, the rings 25 and 29 are fastened, in the normal position thereof, by a light or weak joint 30 which is first broken, in the event of an accident, by the action of relatively large forces produced by the inner pressure. The piston rings 25 and 29 are then pressed in axial direction against respective sealing surfaces formed, for example, on insert sleeves 31.

To minimize outer inspection of the reactor cover 2 by removing threaded stoppers or plug 32, the capture cover 12 is constructed so that it can be raised for example 10 to 20 cm. without having to remove the numerous tubes 18 and 19 therein.

By means of the aforedescribed safety devices in the form of a capture cover 12 and capture ring 13 on the reactor cover, the respective emergency supports and the disposition of the sealing rings, the consequences of a rupture of the reactor pressure vessel can be markedly controlled or checked in a relatively simple manner.

Obviously, the basic principle of the invention can be employed in a similar sense for pressure vessels having covers that are located on the side or at the bottom thereof, and which are intended to accommodate different types of high pressure media.

I claim:

1. The combination of a pressure vessel having a cover to which tubes are secured and a safety device for the pressure vessel, comprising a capture cover shaped substantially to conform thereto and disposed on the outside of the pressure vessel cover by means positioned slightly above said capture vessel cover, said means providing play between said capture cover and said pressure vessel cover during normal operating condition of the pressure vessel, said capture cover becoming effective during abnormal operating condition of the pressure vessel for covering the pressure vessel pursuant to rupture of the pressure vessel cover, said capture cover being formed with openings through which the tubes secured to the pressure vessel cover extend and being removable from the pressure vessel together with the pressure vessel cover.

2. The combination according to claim 1 wherein the pressure vessel is for a water-cooled nuclear reactor having a reactor core contained in the pressure vessel, said capture cover being disposed on the side of the reactor pressure vessel cover facing away from the reactor core.

3. The combination according to claim 2 wherein the pressure vessel cover is secured in the pressure vessel by a plurality of threaded members disposed substantially at the periphery of the pressure vessel cover, said capture cover overlying a region of said pressure vessel cover located between said threaded members, a capture ring securing said capture cover to said pressure vessel cover, said capture ring extending radially inwardly above said threaded members and the peripheral region of said capture cover and being releasably secured at the radially outer periphery thereof by other threaded members to an anchor ring of the reactor.

4. The combination according to claim 3 wherein said capture ring is formed of individual segments having radially outwardly extending supporting arms.

5. The combination according to claim 3 including a saw-tooth joint having said play located between said capture ring and said capture cover, said capture ring being in engagement, during normal operation of the reactor, with said capture cover through said saw-tooth joint.

6. The combination according to claim 2 including a concrete shielding surrounding said reactor core, and auxiliary vertical and radial emergency supports between the core of the reactor and said reactor pressure vessel, on the one hand, as well as between said reactor pressure vessel and said concrete shielding, on the other hand, said supports being actuable into active engagement only in the event of rupture of said pressure vessel.

7. The combination according to claim 2 wherein said capture cover is capable of being slightly raised above said pressure vessel cover without removing said tubes secured to said pressure vessel cover, and including a threaded stopper disposed in said capture cover and removable for permitting inspection of said pressure vessel cover.

8. The combination according to claim 2 wherein said pressure vessel is surrounded by a support ring and an anchor ring of the reactor, main coolant lines extending between said support and said anchor rings and connected to said pressure vessel, and including piston rings provided for said main coolant lines in the vicinity of said support and said anchor rings for limiting discharge of coolant in the event of rupture of said pressure vessel, said piston rings being held securely against vibration during normal operation of the reactor and only being releasable from a light support therefor and brought into engagement with radially disposed sealing surfaces due to accident-produced forces.

9. The combination according to claim 2 including piston rings provided for said tubes secured to said pressure vessel for limiting discharge of coolant in the event of rupture of said pressure vessel, said piston rings being held securely against vibration during normal operation of the reactor and only being releasable from a light support therefor and brought into engagement with radially disposed sealing surfaces due to accident-produced forces.

10. The combination according to claim 3 including thermally insulating intermediate sheets disposed respectively between said pressure vessel cover, said capture cover and said capture ring.

11. The combination according to claim 10 including an anchor ring of the reactor surrounding said pressure vessel, thermally insulating sheets being interposed between the anchor ring and said capture ring.

References Cited

UNITED STATES PATENTS

| | | | |
|---|---|---|---|
| 3,121,046 | 2/1964 | Trickett et al. | 176—87 X |
| 2,890,009 | 6/1959 | Chapellier | 176—87 U X |
| 3,578,564 | 5/1971 | Fletcher III | 176—38 X |
| 3,462,345 | 8/1969 | Jabsen | 176—36 |
| 2,533,771 | 12/1950 | DeFrees | 220—29 X |
| 3,506,540 | 4/1970 | Yerick et al. | 176—87 |
| 3,525,669 | 8/1970 | Germer | 176—87 X |
| 3,255,912 | 6/1966 | Schmid | 220—29 X |

FOREIGN PATENTS

| | | | |
|---|---|---|---|
| 845,305 | 8/1960 | Great Britain | 176—87 |
| 1,199,145 | 12/1959 | France | 176—87 |
| 602,598 | 3/1960 | Italy | 176—87 |

CARL D. QUARFORTH, Primary Examiner

H. E. BEHREND, Assistant Examiner

U.S. Cl. X.R.

176—87; 220—29